United States Patent [19]
Schlaegel

[11] Patent Number: 5,189,826
[45] Date of Patent: Mar. 2, 1993

[54] FISHING DEVICE

[76] Inventor: Gene A. Schlaegel, 1810 Winston Dr., Iowa City, Iowa 52245

[21] Appl. No.: 849,623

[22] Filed: Mar. 9, 1992

[51] Int. Cl.⁵ ............................................. A01K 83/06
[52] U.S. Cl. ...................................... 43/42.29; 43/44.6
[58] Field of Search ................. 43/42.29, 44.6, 41, 43/44.99, 44.2, 36, 41.2; 2/340; 24/496

[56] References Cited

U.S. PATENT DOCUMENTS

| | | | |
|---|---|---|---|
| 1,731,161 | 10/1929 | Farley | 43/42.29 |
| 2,582,646 | 1/1952 | Moore | 43/44.2 |
| 2,659,996 | 11/1953 | Hegler, Jr. | 43/44.6 |
| 3,293,790 | 12/1966 | Konomos | 43/44.2 |
| 3,457,666 | 7/1969 | Klinkhamer | 43/41 |
| 3,742,639 | 7/1973 | Butts | 43/42.39 |
| 4,189,860 | 2/1980 | Ebert | 43/42.29 |
| 4,796,376 | 1/1989 | Schlaegel | 43/42.29 |
| 4,910,907 | 3/1990 | Schlaegel | 43/44.6 |
| 5,027,544 | 7/1991 | Schlaegel | 43/44.6 |

FOREIGN PATENT DOCUMENTS 8409 of 1908 United Kingdom ................ 43/44.6

Primary Examiner—Richard K. Seidel
Assistant Examiner—Jeanne M. Elpel

[57] ABSTRACT

A bait harness adapted to hold a bait in the form of a fish or fillet includes a fixed jaw and a juxtaposed jaw movable into and out of engagement therewith. A lever pivotally secured to the fixed jaw acts to forcibly move the movable jaw towards the fixed and to hold the jaws in clamping engagement with a bait, and to release the jaws from such engagement. Hooks are provided on the jaws for impalement of any bait fish therebetween.

15 Claims, 3 Drawing Sheets

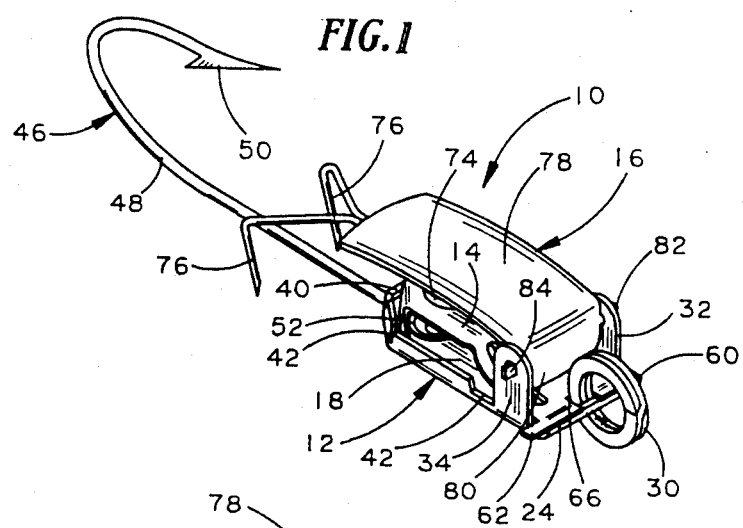
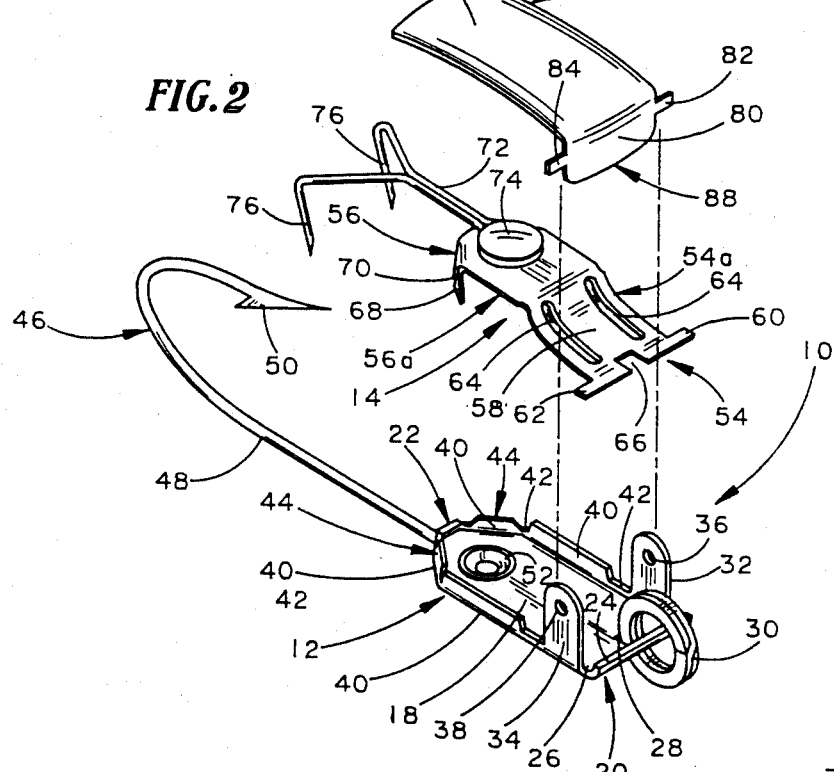
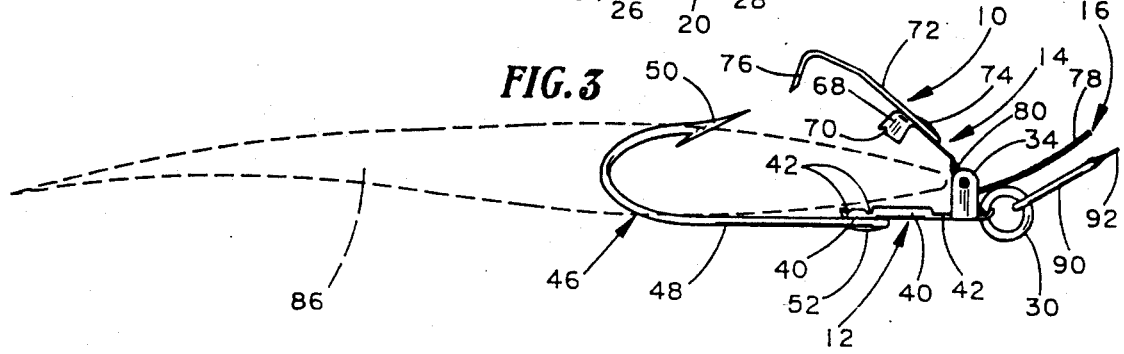

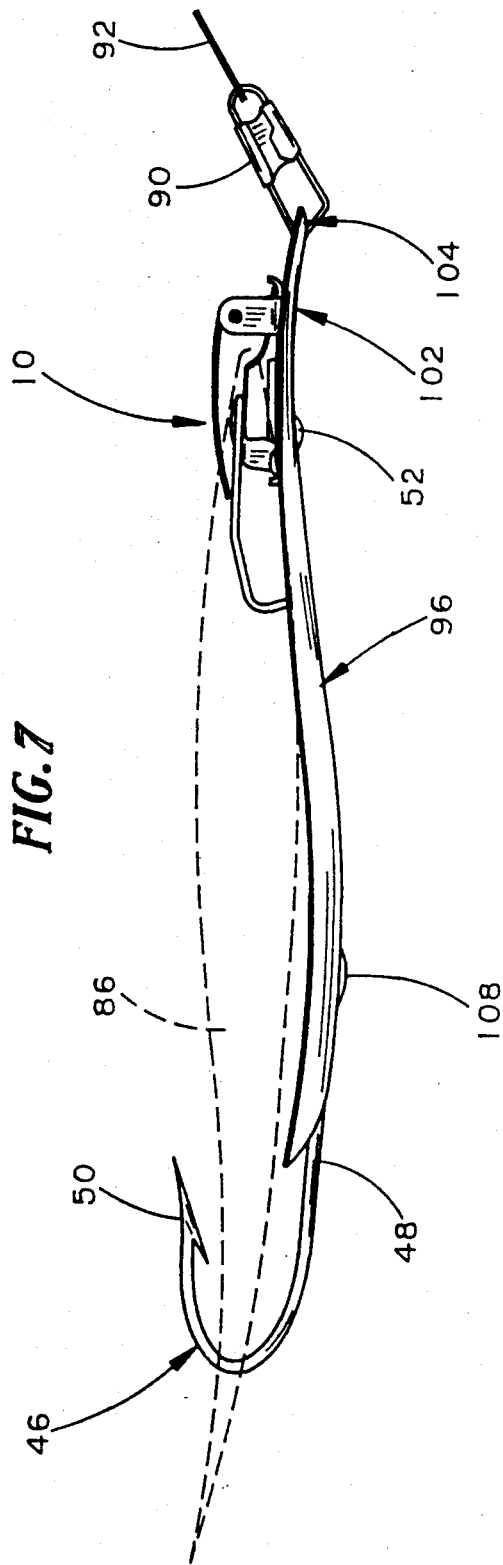
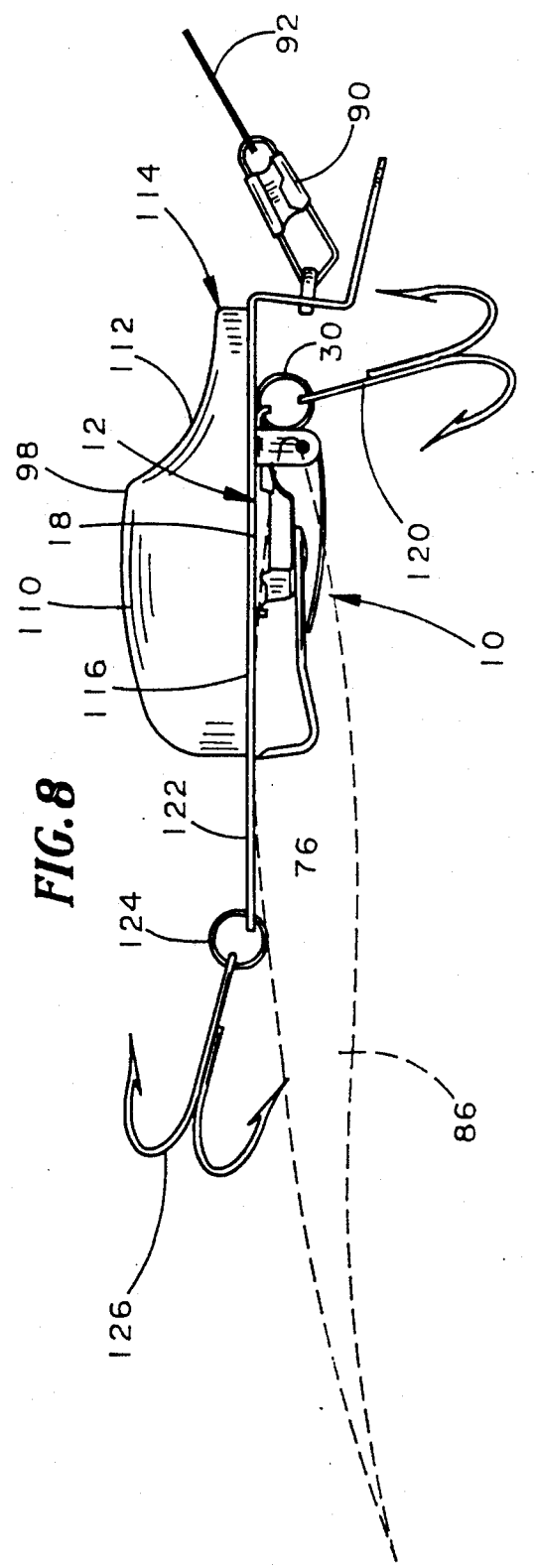

FISHING DEVICE

BACKGROUND OF THE INVENTION

This invention relates to fishing devices and more particularly to improvements in a bait harness adapted to hold a bait in the form of a whole fish or a fillet.

Such types of harnesses have long been used in a variety of forms as exemplified in U.S. Pat. Nos. 4,189,860, 3,293,790, 3,457,666, 2,582646 and in my own U.S. Pat. Nos. 4,796,376, 4,910,907 and 5,027,544 and one of the important objects of this invention is to provide further novel improvements in such harnesses as compared with those presently known.

Another object herein is to provide a bait harness as characterized which is simple in construction, economical to manufacture, quick and easy for attachment to and removal from the bait and very efficient for its intended purpose.

Another object herein is to provide a bait harness of the above class that can be used to advantage with various forms of fishing lures such as plugs, spoons, lead head jigs, single and double hooks and the like whereby a fisherman can practice different fishing techniques as the situation may present.

SUMMARY

In accordance with the present invention, a bait harness adapted to hold a bait in the form of a fish or fillet, includes a fixed jaw and a juxtaposed movable jaw that is operably pivotally arranged at one end relative to the fixed jaw so that it can be moved into and out of engagement with the fixed jaw for clamping engagement of the bait. A lever pivotally secured to spaced ears on the fixed jaw acts to forcibly move the movable jaw towards the fixed jaw and holds the jaws in engaged position with a bait, and to release the jaws. The lower jaw carries an extended upturned fish hook for impaling the bait from one side and the upper jaws carries a corresponding extending downturned prong for impaling the bait from the opposite side.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view of a fishing device according to this invention,

FIG. 2 is a perspective exploded view of the device in FIG. 1,

FIG. 3 is a side elevational view of this fishing device shown with the jaws open to receive a bait fish, FIG. 7 is a side elevational view similar to FIG. 5 showing this fishing device used with a spoon, and FIG. 8 is a side elevational view similar to FIGS. 5 showing this fishing device used with an artificial fishing lure plug.

Figure 4:
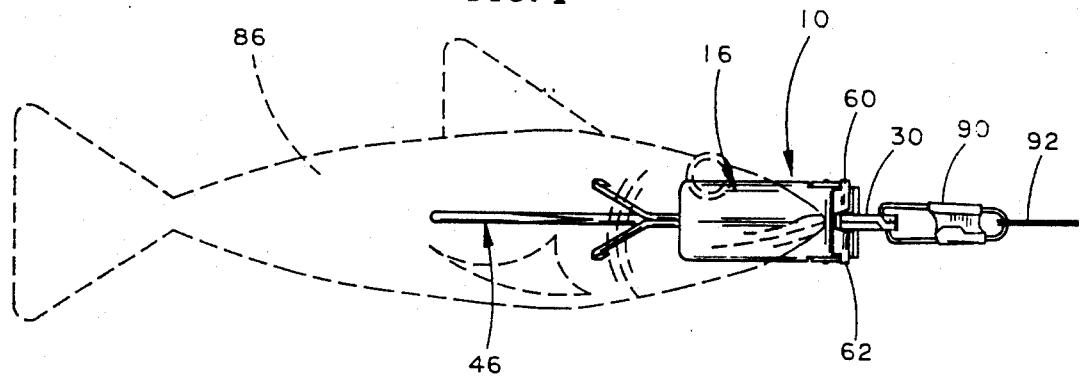
FIG. 4 is a top plan view showing the device in FIG. 3 securing a bait fish.
Figure 5:
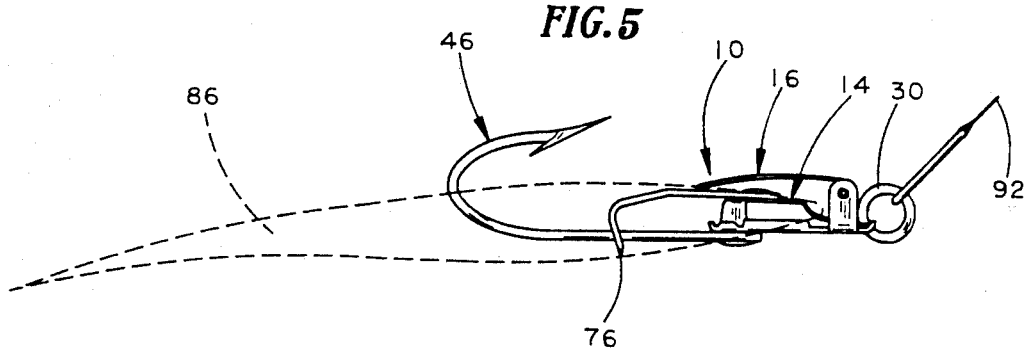
FIG. 5 is a side elevational view of FIG. 4.
Figure 6:
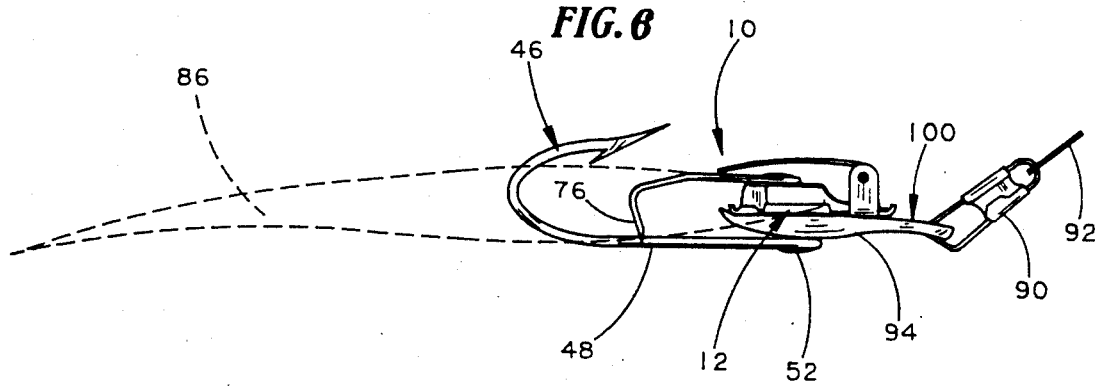
FIG. 6 is a side elevational view similar to FIG. 5 showing this fishing device used with a lead head jig.

The broken line showing of a bait fish in FIGS. 3-8 is for illustrative purposes only and forms no part of the claimed invention.

DESCRIPTION OF THE PREFERRED EMBODIMENTS

Referring to the drawings, this new fishing device, designated by the numeral 10, is a modification of a suspender type clip and includes in general, a fixed lower jaw member 12, a movable upper jaw member 14 and an operating lever 16, constructed and arranged as follows.

The fixed jaw member 12 has a generally rectangular flat base 18 defining, for purposes of description, a leading end 20 and a trailing end 22, with said leading end 20 turned upwardly to provide the stub shoulder 24 and the transverse groove 26. Centrally of groove 26 is a hole 28 that extends into shoulder 24 to receive a split ring 30. On opposite sides of base 18 adjacent groove 26 are upstanding ears 32,34, apertured near the top at 36,38, and on the side edge of base 18 rearwardly of ears 32,34 towards and around the trailing end 22 there is an upstanding rib or flange 40 provided with spaced notches 42 so that flange 40 defines a plurality of jaw teeth for member 12. The trailing end 22 of base 18 may be rounded or bevelled as at 44. A single fish hook 46 comprising an elongated shank 48 with an integral barbed point 50 on one end is secured at the other end by a rivet or the like 52 to the trailing end of base 18 so that hook 46 is in a trailing relationship to such base and with the barbed point 50 in a riding up position as shown.

The movable jaw member 14 is also generally rectangular of a flat material having a leading end 54 and a trailing end 56 arranged relative to the corresponding ends 20,22 on base 18 and, for purposes of description, defines a leading portion 54a and a trailing portion 56a. Portion 54a extends downwardly and forwardly from portion 56a in a slight curve to provide the concave surface 58 and at end 54 there are the respective bosses 60,62 that project outwardly from each side of member 14 as best seen in FIG. 4. The concave surface 58 is provided with spaced reinforcing grooves 64 and at end 54, intermediate bosses 60.62, is a notch 66.

The trailing end 56 of jaw member 14 is similarly shaped as the trailing end 22 on jaw member 12 and is provided with a downwardly extending flange or rib 68 which is notched 70 to define jaw teeth similar to that described for jaw member 12. An elongated shank 72 has one end attached to portion 56a of jaw member 14 by a rivet or the like 74 so that it is in a trailing relationship to such jaw member, and has bifurcated downwardly oriented prongs 76 on its other end.

Jaw member 14 is arranged in juxtaposition to jaw member 12 and is movable towards and away from member 12 by being pivotal on end 54 which is seated in groove 26, with notch 66 in registration with hole 26 to accommodate ring 30, and with respective bosses 60,62 extending in said groove transversely of the forward edges of the respective ears 32,34. The overall width of jaw member 14 rearwardly of bosses 60,62 and the length of such jaw member, is such that the teeth on member 14 nest within the confines of the teeth on end 22 of jaw member 12 as best seen in FIG. 1.

Lever 16 is bent downwardly at one end into an L-shape to provide a long lever arm or handle 78 and an angularly disposed shorter arm 80. On the opposite sides of arm 80 are the respective outwardly projecting bosses 82,84 that are respectively pivotally journalled in the respective apertures 36,38 of ears 32,34 so that the arm 80 can be moved into and out of slidable engagement with surface 58 on the leading portion 54a of jaw member 14.

To use device 10 as described, lever arm 78 is lifted away from jaw member 14 and rotated on bosses 82,84 towards end 20 to the position seen in FIG. 3 where arm 80 will have been rotated to a substantially vertical plane to be sufficiently spaced from surface 58 on jaw member 14 so that said jaw member can be elevated or opened relative to jaw member 12 to a point where surface 58 abuts the outer surface of arm 80 as shown. A bait fish 86 is inserted at the head portion between jaw members 12,14, and hook point 50 is impaled through the tail portion of the bait as seen in FIG. 3. Lever arm 78 is then rotated rearwardly toward jaw ends 22,56 during which motion edge 88 of arm 80 will slidably and forcibly bear against surface 58 to press jaw members 12,14 towards each other in clamp-engagement with bait 86 until lever arm 78 is in juxtaposition to such jaws and prongs 76 are imbedded in bait 86 on the opposite side of such bait as hook point 50. In this movement of lever arm 78, edge 88 of arm 80, in pressing engagement with surface 58, moves rearwardly past center whereby arm 78 effectively holds jaw members 12,14 in locked position on bait 86 (Figs. 4,5) until it is elevated so the jaws can be opened. A clip 90 for a fishing line 92 is attached to ring 30.

Thus far described, device 10 provides a highly efficient and effective means for securely holding a bait fish 86 for casting, trolling or jigging and to enhance different fishing techniques, I have shown it adapted for use with different forms of artificial lures such as a lead head jig 94 (FIG. 6), a spoon 96 (FIG. 7) and a buoyant plug 98 (FIG. 8).

When device 10 is used with the lead head jig 94 (FIG. 6), the underside of jig 94 is placed in abutting engagement with the underside of jaw member 12, and the free end of shank 48 of hook 46 is positioned on the outer side of jig 94 with both said shank and jig being secured to jaw member 12 by rivet 52 so that hook 46 is in the same trailing riding up position as seen in FIG. 1. The leading end 100 of jig 94 is apertured to receive a clip 90 and line 92 so that ring 30 is not required in this embodiment.

With the use of a spoon 96 (FIG. 7), the leading end portion 102 of the spoon is secured in abutting engagement to jaw member 12 by rivet 52 and the extreme leading end 104 of spoon 96 is apertured to receive a clip 90 and line 92 so that ring 30 is also not needed with this embodiment. The trailing end 106 of spoon 94 is apertured so that shank 48 of hook 46 can pass therethrough as shown for attachment to such trailing end by a rivet or the like 108 whereby the barbed point 50 on hook 46 is in a trailing relationship to spoon 96 and in a riding up position as previously described.

The buoyant plug 98 (FIG. 8) used with device 10 may be of any well known type and configuration and as shown, includes a body 110 having a concave nose portion 112 at its leading end 114. Body 110 is mounted on an elongated base plate 116 that, at end 114, extends downwardly and forwardly to form the projecting apertured lip 118 in a form and arrangement that is well known. A clip 90 and a line 92 is attached to lip 118 as shown. The underside of base 18 of jaw member 12 is secured in abutting engagement with plate 116 below plug body 110 by rivet 52. Hook 46 is not required in this embodiment. Device 10 here is thus inverted in use relative to its position in the other embodiments but operates as previously described relative to clamping of the head of the bait 86 and the impaling of the bait by prongs 76. A dangling fish hook 120, of any preferred number of barbed points, depends from ring 30. The trailing end of plate 116 projects from plug body 110 as at 122 and has a ring 124 to which is attached the freely movable fish hook 126 that will ride on the top surface of bait 86 as shown. Accordingly, in view of the foregoing, it is thought a full understanding of the construction and operation of this invention will be had and the advantages of the same will be appreciated.

I claim:

1. A fishing device, comprising:
   a fixed jaw adapted for attachment to a fishing line,
   a movable jaw disposed in juxtaposition to said fixed jaw and movable towards and away from the same,
   a lead head jig secured to said fixed jaw,
   a locking lever defining an elongated handle terminating at one end in an integral angularly disposed arm,
   means pivotally securing said arm to one end of said fixed jaw above said movable jaw whereby, in locked position, said handle is in juxtaposition with said movable jaw and said arm is oriented towards and in engagement with said movable jaw,
   in unlocked position, said handle and arm being movable out of engagement with said movable jaw whereby said movable jaw is movable away from said fixed jaw sufficiently to permit the selective insertion and removal of a bait fish therebetween, and
   said handle being movable to juxtaposition with said movable jaw to effect the pivotal movement of said arm in forcible pressing engagement with said movable jaw for urging and holding said jaws in locking engagement on any bait fish therebetween.

2. A fishing device as defined in claim 1, including a fish hook secured to said fixed jaw for impalement into a bait fish secured by said jaws.

3. A fishing device as defined in claim 1, including a fish hook secured to said movable jaw for impalement into a bait fish secured by said jaws.

4. A fishing device as defined in claim 2, including: said fish hook being secured to said lead head jig.

5. A fishing device, comprising:
   an elongated fixed lower jaw defining a leading end adapted for attachment to a fishing line, and a trailing end,
   said leading end having an integral upturned stub shoulder,
   opposed upstanding ears, apertured near their top end, on said jaw in close spaced relationship to said stub shoulder,
   an elongated movable upper jaw disposed in juxtaposition to said fixed jaw for movement towards and away from the same, and having corresponding leading and trailing ends,
   said movable jaw having a planar surface from its trailing end to approximately its longitudinal center and a concave surface from said center to its leading end,
   opposed outwardly projecting bosses on said leading end of said movable jaw with said leading end disposed adjacent said stub shoulder, and with said bosses movably resting respectively intermediate said stub shoulder and said respective ears,
   a fish hook comprising an elongated shank and a barbed point on one end, the other end of said shank secured to the trailing end of said fixed jaw with said barbed point in a riding up position, a second fish hook comprising an elongated shank with an angularly disposed prong on one end, the other end of said shank secured to the trailing end of said movable jaw with said prong in a riding down position, a locking lever bent at one end to define a long arm which serves as a handle, and an angularly disposed short arm, opposed outwardly projecting bosses on said short arm pivotally disposed respectively in the apertures of said ears whereby in locked position, said handle is in juxtaposition with said movable jaw and said short arm is oriented towards and in engagement with said movable jaw, said handle being movable away from said movable jaw to effect the pivotal movement of said short arm to a position spaced from said movable jaw to define the unlocked position of said lever whereby said movable jaw is movable away from said fixed jaw sufficiently to permit the selective insertion and removal of a bait fish therebetween, and said handle being movable to juxtaposition with said movable jaw to effect the pivotal movement of said short arm into forcible pressing engagement with said concave surfaces on said movable jaw for urging and holding said jaws in locking engagement on any bait fish therebetween and with said barbed point being impaled into a bait fish one one side thereof and said prong being impaled into the bait fish from the other side thereof.

6. A fishing device as defined in claim 5, including:
a lead head jig secured to said fixed jaw, and
the other end of said shank having the barbed point being secured to said lead head jig.

7. A fishing device as defined in claim 5 including:
a fishing lure spoon secured to said fixed jaw, and
the other end of said shank having the barbed point being secured to said fishing lure spoon.

8. A fishing device, comprising:
a fixed lower jaw adapted for attachment to a fishing line,
a movable upper jaw disposed in juxtaposition to said fixed jaw and movable towards and away from the same,
said jaws having corresponding leading and trailing ends,
a fish hook comprising an elongated shank and a barbed point on one end,
the other end of said shank secured to the trailing end of said fixed jaw with said barbed point in a riding up position,
a second fish hook comprising an elongated shank with an angularly disposed prong on one end,
the other end of said shank secured to the trailing end of said movable jaw with said prong in a riding down position,
a locking lever defining an elongated handle terminating at one end in an integral angularly disposed arm,
means pivotally securing said arm to one end of said fixed jaw above said movable jaw whereby, in locked position, said handle is in juxtaposition with said movable jaw and said arm is oriented towards and in engagement with said movable jaw, in unlocked position, said handle and arm being movable out of engagement with said movable jaw whereby said movable jaw is movable away from said fixed jaw sufficiently to permit the selective insertion and removal of a bait fish therebetween and said handle being movable to juxtaposition with said movable jaw to effect the pivotal movement of said arm in forcible pressing engagement with said movable jaw for urging and holding said jaws in locking engagement on any bait fish therebetween and with said barbed point being impaled into the bait fish from one side thereof and said prong being impaled into the bait fish from the other side thereof.

9. A fishing device as defined in claim 8, including:
a lead head jig secured to said fixed jaw, and
the other end of said shank having the barbed point being secured to said lead head jig.

10. A fishing device as defined in claim 8, including
a fishing lure spoon secured to said fixed jaw, and
the other end of said shank having the barbed point being secured to said fishing lure spoon.

11. A fishing device, comprising:
a fixed jaw adapted for attachment to a fishing line,
a movable jaw disposed in juxtaposition to said fixed jaw and movable towards and away from the same,
a fishing lure spoon secured to said fixed jaw,
a locking lever defining an elongated handle terminating at one end in an integral angularly disposed arm,
means pivotally securing said arm to one end of said fixed jaw above said movable jaw whereby, in locked position, said handle is in juxtaposition with said movable jaw and said arm is oriented towards and in engagement with said movable jaw,
in unlocked position, said handle and arm being movable out of engagement with said movable jaw whereby said movable jaw is movable away from said fixed jaw sufficiently to permit the selective insertion and removal of a bait fish therebetween, and
said handle being movable to juxtaposition with said movable jaw to effect the pivotal movement of said arm in forcible pressing engagement with said movable jaw for urging and holding said jaws in locking engagement on any bait fish therebetween.

12. A fishing device as defined in claim 11, including:
a fish hook being secured to said spoon.

13. A fishing device as defined in claim 11 including a fish hook secured to said movable jaw.

14. A fishing device, comprising:
a fixed jaw adapted for attachment to a fishing line,
a movable jaw disposed in juxtaposition to said fixed jaw and movable towards and away from the same,
an artificial fishing lure plug secured to said fixed jaw,
said jaws having corresponding leading and trailing ends,
a fish hook comprising an elongated shank with an angularly disposed prong on one end,
the other end of said shank secured to said trailing end of said movable jaw,
said prong adapted to be impaled into a fish bait secured by said jaws,
a dangling fish hook attached to the leading end of said fixed jaw,
said plug including a base plate projecting rearwardly therefrom, a second dangling fish hook attached to the projected end of said base plate, a locking lever defining an elongated handle terminating at one end in an integral angularly disposed shorter arm, means pivotally securing said arm to one end of said fixed jaw above said movable jaw whereby, in locked position, said handle is in juxtaposition with said movable jaw and said arm is oriented towards and in engagement with said movable jaw, in unlocked position, said handle and arm being movable out of engagement with said movable jaw whereby said movable jaw is movable away from said fixed jaw sufficiently to permit the selective insertion and removal of a bait fish therebetween, and said handle being movable to juxtaposition with said movable jaw to effect the pivotal movement of said arm in forcible pressing engagement with said movable jaw for urging and holding said jaws in locking engagement on any bait fish therebetween.

15. A fishing device, comprising:

an elongated fixed jaw defining a leading end adapted for attachment to a fishing line, and a trailing end, said leading end having an integral upturned stub shoulder, opposed upstanding ears, apertured near their top end, on said jaw in close spaced relationship to said stub shoulder, an elongated movable jaw disposed in juxtaposition to said fixed jaw for movement towards and away from the same, and having corresponding leading and trailing ends, said movable jaw having a planar surface from its trailing end to approximately its longitudinal center and a concave surface from said center to its leading end, opposed outwardly projecting bosses on said leading end of said movable jaw with said leading end disposed adjacent said stub shoulder, and with said boses movably resting respectively intermediate said stub should and said respective ears, an artificial fishing lure plug secured to said fixed jaw, a fish hook secured to said movable jaw for impalement in a bait fish, a dangling fish hook attached to the leading end of said fixed jaw, said plug including a rearwardly projecting base plate, a second dangling fish hook attached to the projected end of said base plate, a locking lever bent at one end to define a long arm which serves as a handle, and an angularly disposed short arm, opposed outwardly projecting bosses on said short arm pivotally disposed respectively in the apertures of said ears whereby in locked position, said handle is in juxtaposition with said movable jaw and said short arm is oriented towards and in engagement with said movable jaw.

said handle being movable away from said movable jaw to effect the pivotal movement of said short arm to a position spaced from said movable jaw to define the unlocked position of said lever whereby said movable jaw is movable away from said fixed jaw sufficiently to permit the selective insertion and removal of a bait fish therebetween, and said handle being movable to juxtaposition with said movable jaw to effect the pivotal movement of said shorm into forcible pressing engagement with said concave surface on said movable jaw for urging and holding said jaws in lock-engagement on any bait fish therebetween.

* * * * *